Figure 1:
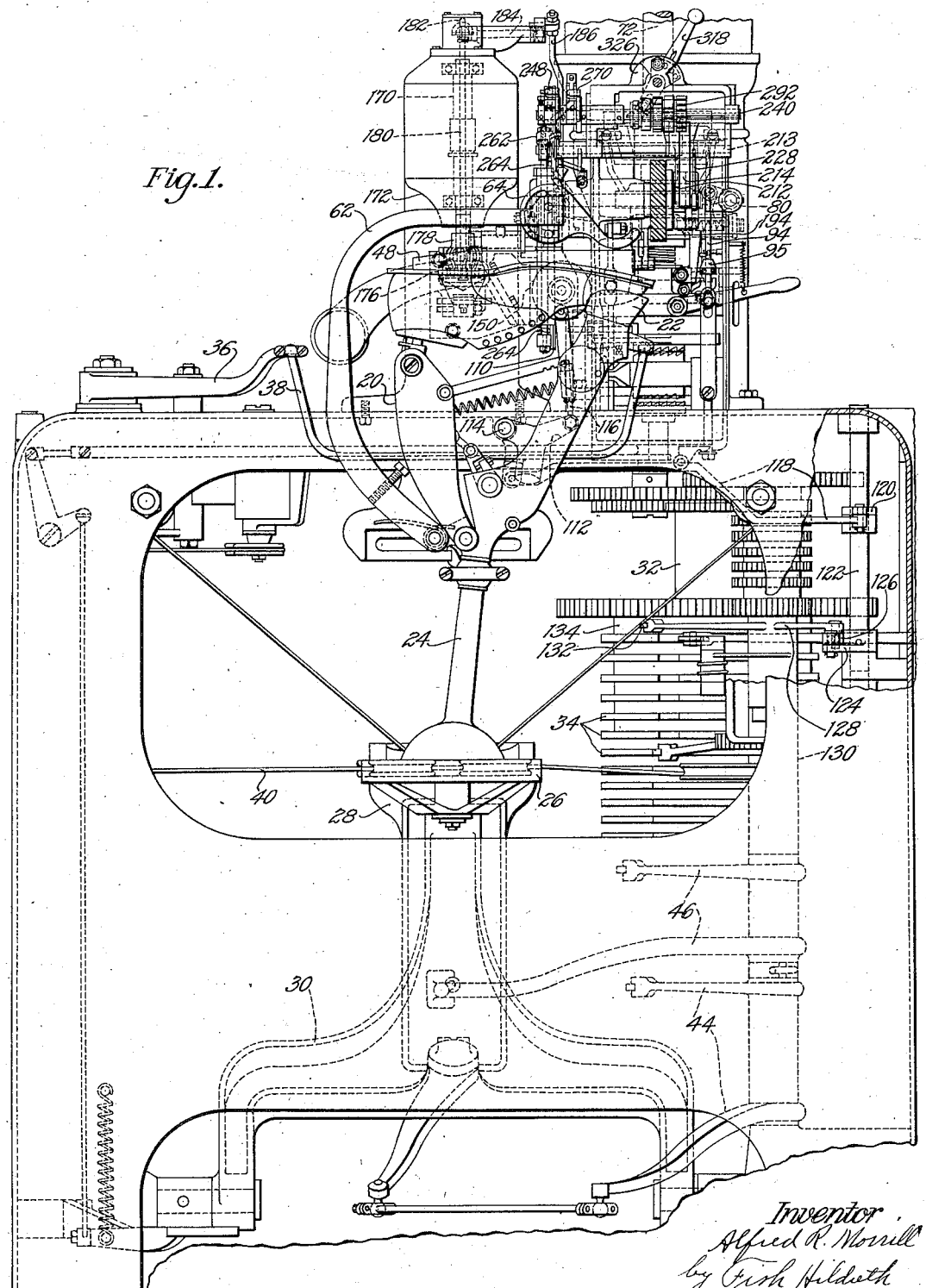

May 12, 1936.  A. R. MORRILL  2,040,756

MACHINE FOR OPERATING UPON SHOES

Filed Oct. 24, 1934  13 Sheets-Sheet 8

Witness
Frank A. Wright

Inventor
Alfred R. Morrill
by Fish Hildreth
Cary & Jenney Attys

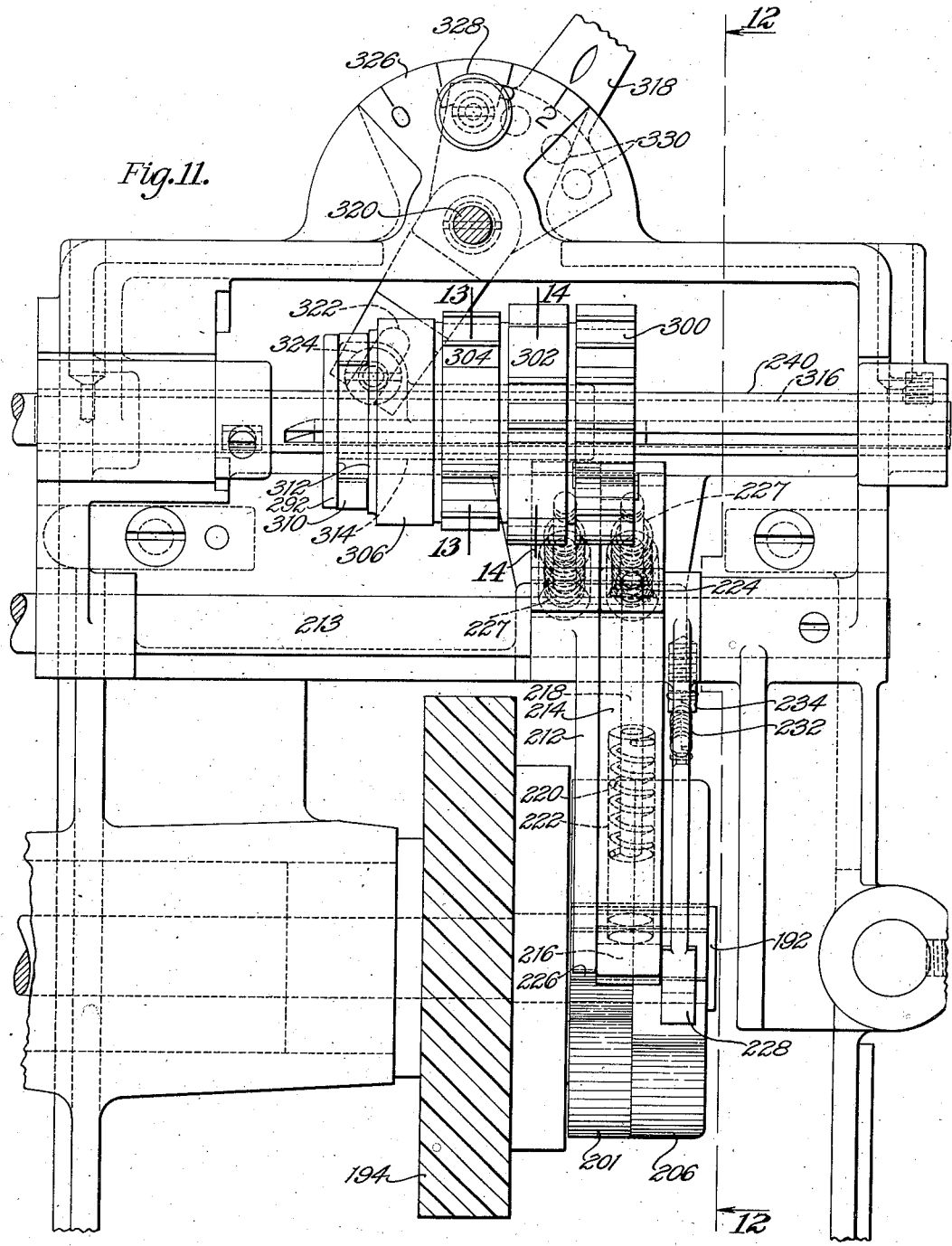

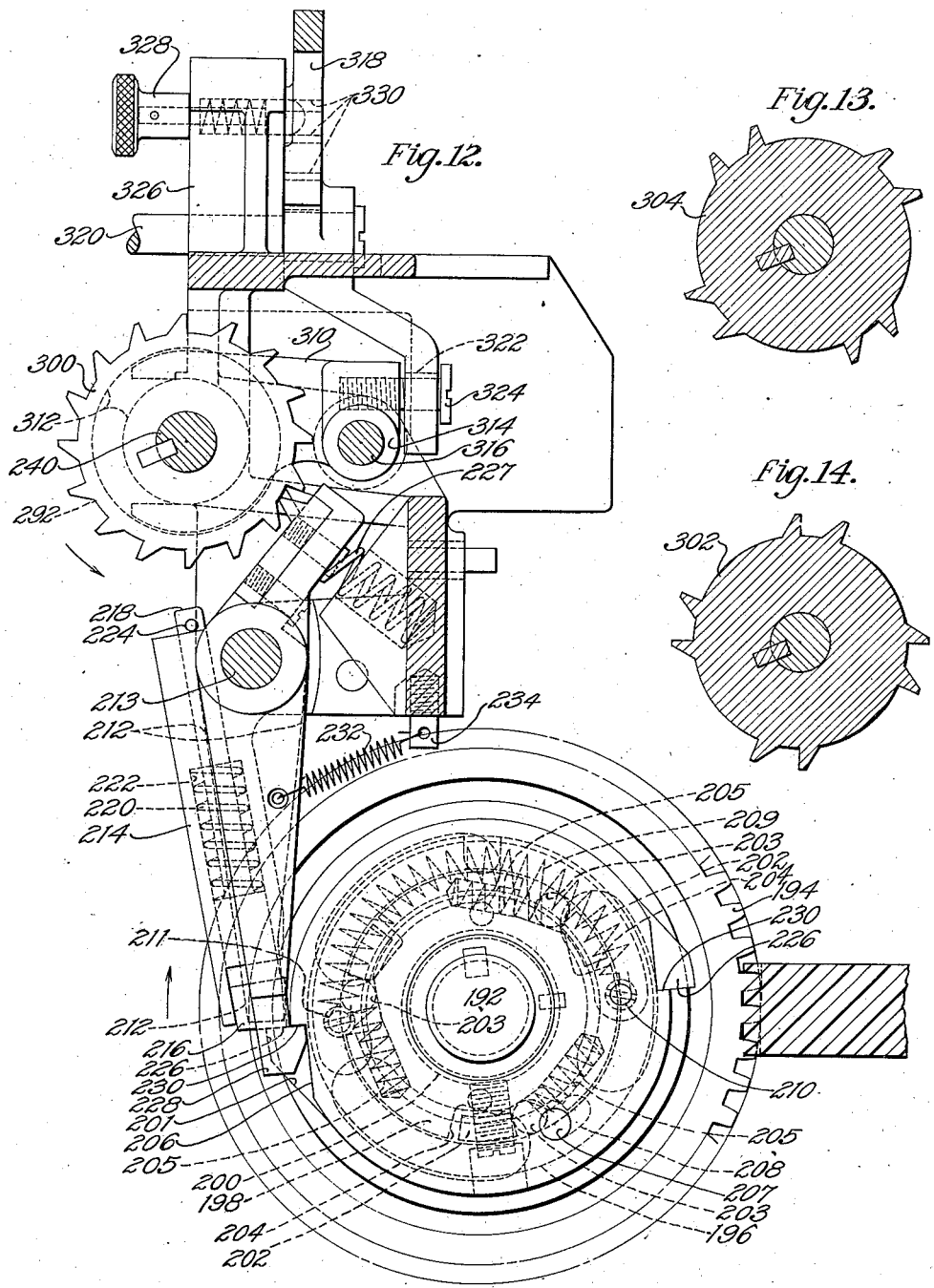

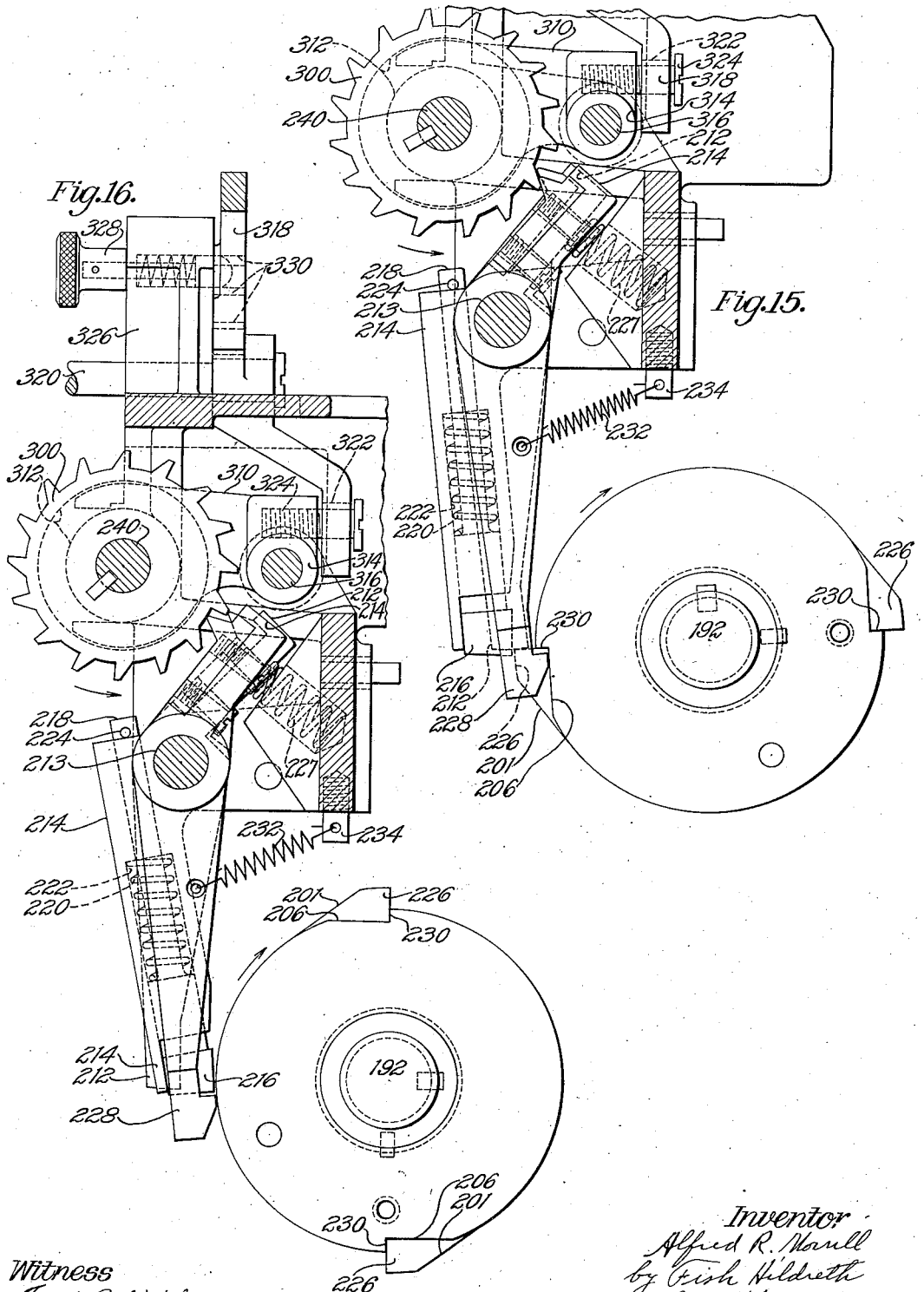

Patented May 12, 1936

2,040,756

UNITED STATES PATENT OFFICE 2,040,756

MACHINE FOR OPERATING UPON SHOES

Alfred R. Morrill, Beverly, Mass., assignor to United Shoe Machinery Corporation, Paterson, N. J., a corporation of New Jersey Application October 24, 1934, Serial No. 749,791

20 Claims. (Cl. 12—17)

The present invention relates to machines which are used in the manufacture of shoes to perform certain operations progressively along the bottom margin of a shoe, and is hereinafter disclosed as embodied in an automatic edge trimming machine having interchangeably mounted forepart and shank edge trimming cutters and provided with a shoe supporting jack which is moved relatively to the edge trimming devices to transfer the point of operation about the shoe. The illustrated machine is also provided with a grading device which is arranged for cooperative engagement with a templet guide rigidly secured to the sole of a shoe supported on the jack to locate the shoe margin laterally with relation to the shoe operating means at the point of contact, and may be adjusted to cause the operating means to follow any one of a plurality of predetermined contour paths about the shoe in accordance with the width of the shoe being operated upon.

While the invention is intended primarily as an improvement in automatic sole edge trimming machines of the general type set forth, certain features of the invention are capable of use in automatic machines performing operations other than that of edge trimming progressively along the bottom margin of the shoe.

It is a principal object of the present invention to provide novel and improved means well adapted for use with a machine of the description set forth which will operate automatically to cause the substitution of one of the operating tools for another at one or more predetermined points in the transfer of the point of operation about the shoe.

It is a further object of the present invention to provide a novel and improved tool selecting mechanism which will be readily adjustable to determine the tools selected thereby for operation on predetermined portions of the margin of the shoe sole so that the operator may, by means of a simple adjustment, set up the machine to trim the margin of the shoe in any desired manner for either a left or a right shoe.

With these and other objects in view, as may hereinafter appear, a principal feature of the present invention consists in the provision of a tool selecting mechanism which is controlled by means of the shoe grading device and by the stop motion of the machine to substitute one tool for the other at the required points in the transfer of the point of operation about the shoe.

Another feature of the invention consists in the provision of means for adjusting the operation of the shifting mechanism to cause the shank edge cutter to be rendered operative interchangeably either upon both sides or upon the left or right side of the shoe being operated upon, or not at all in accordance with the specifications of the work being produced.

Figure 2:
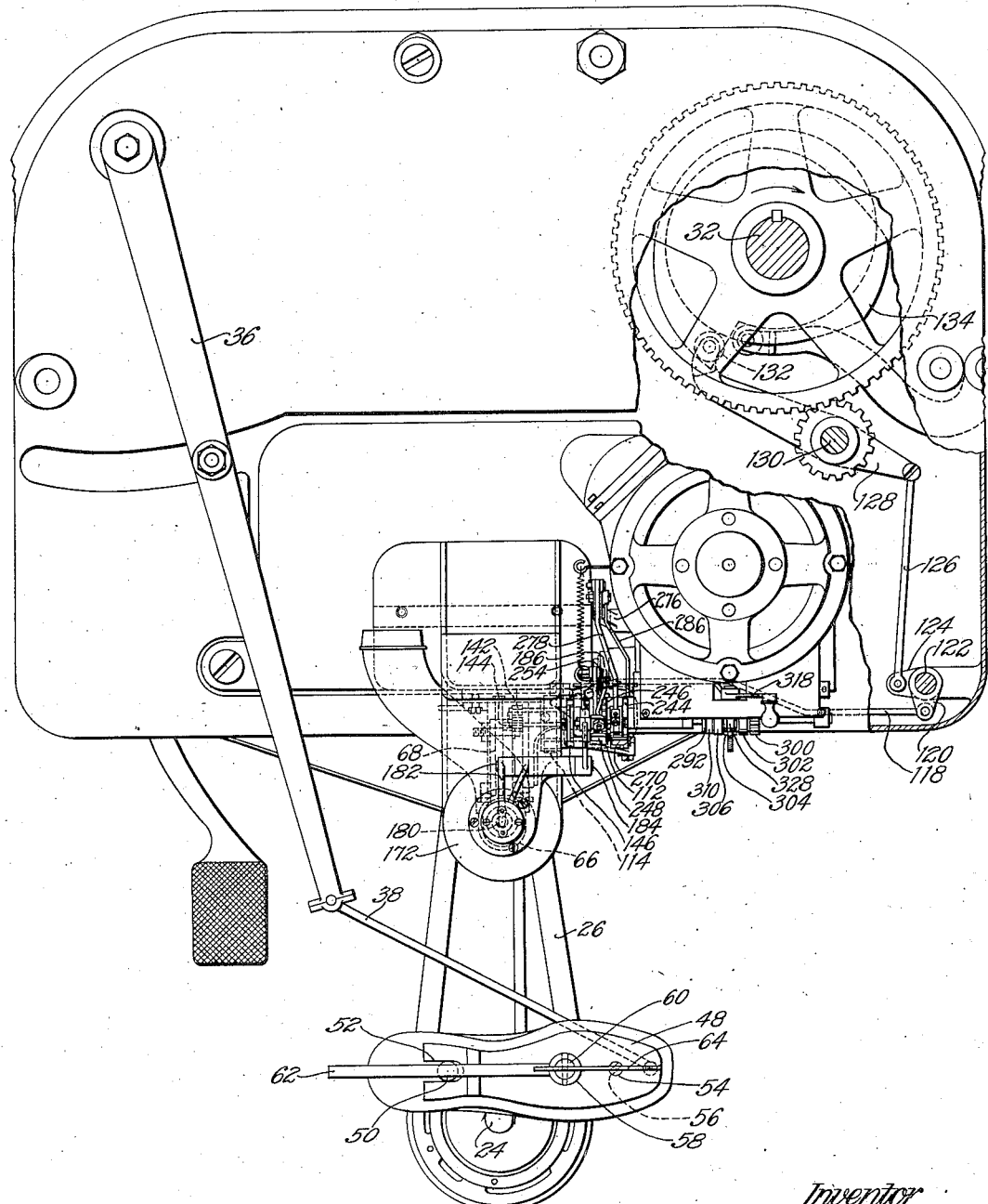
Figure 3:
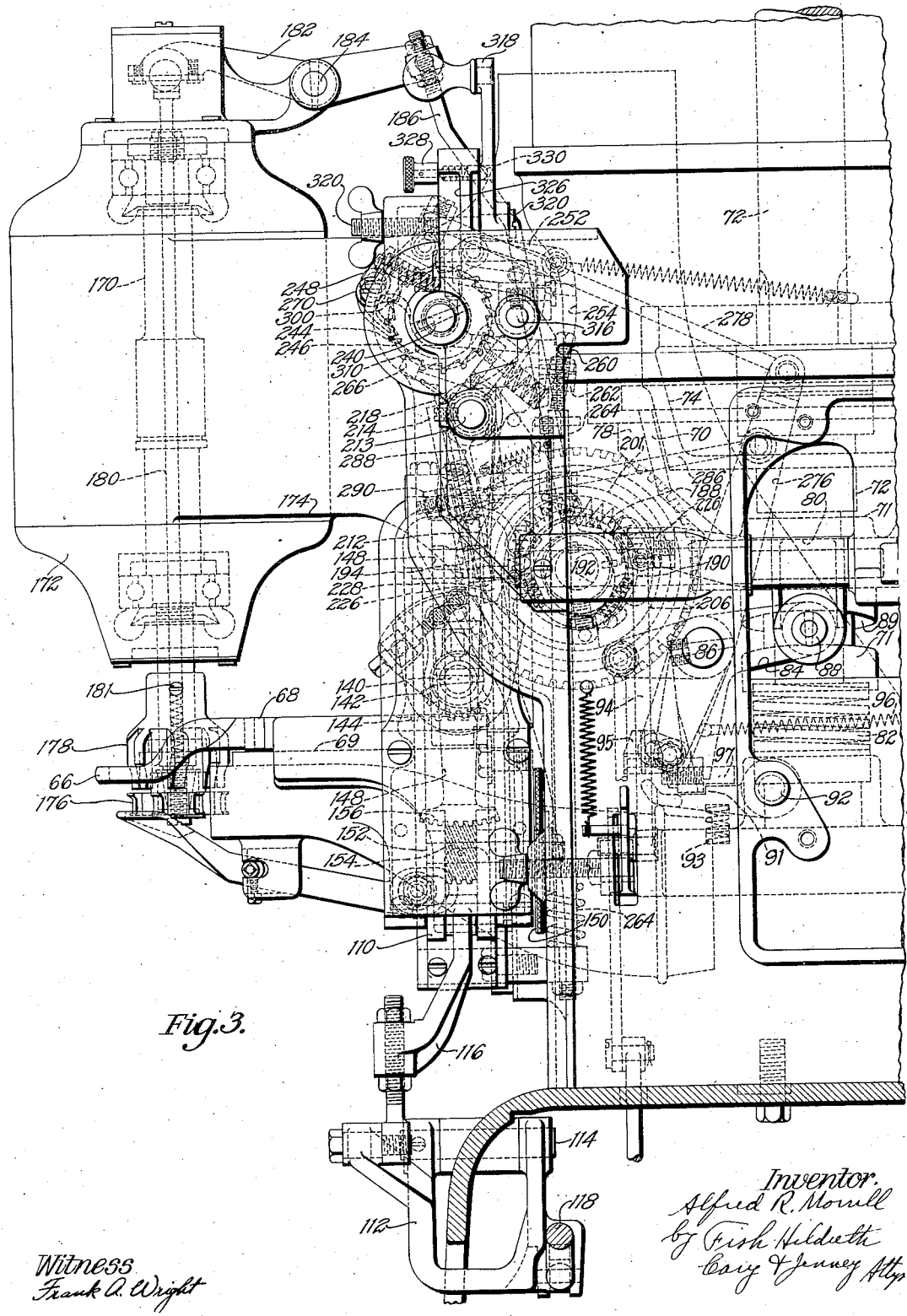
Figure 4:
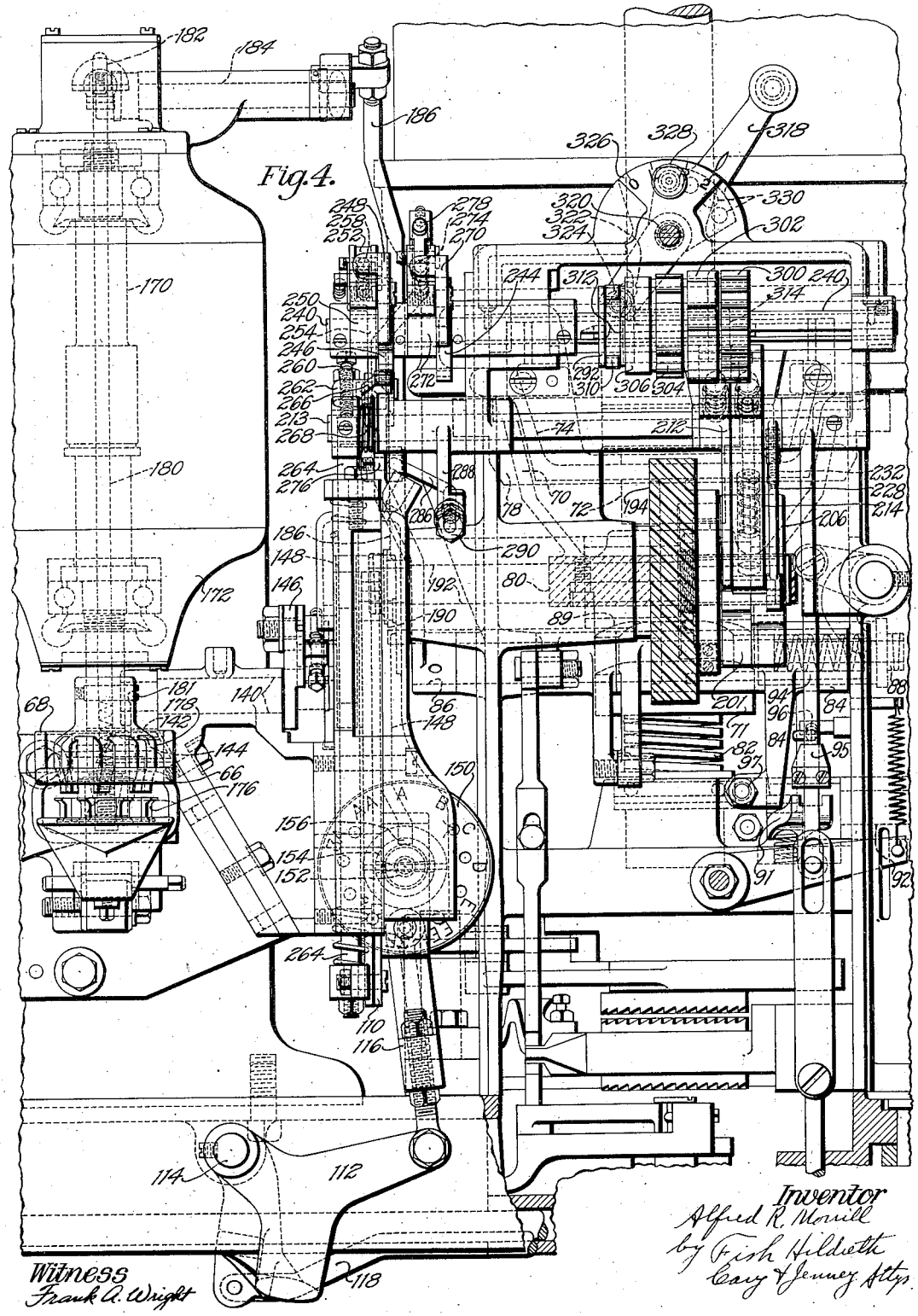
Figure 5:
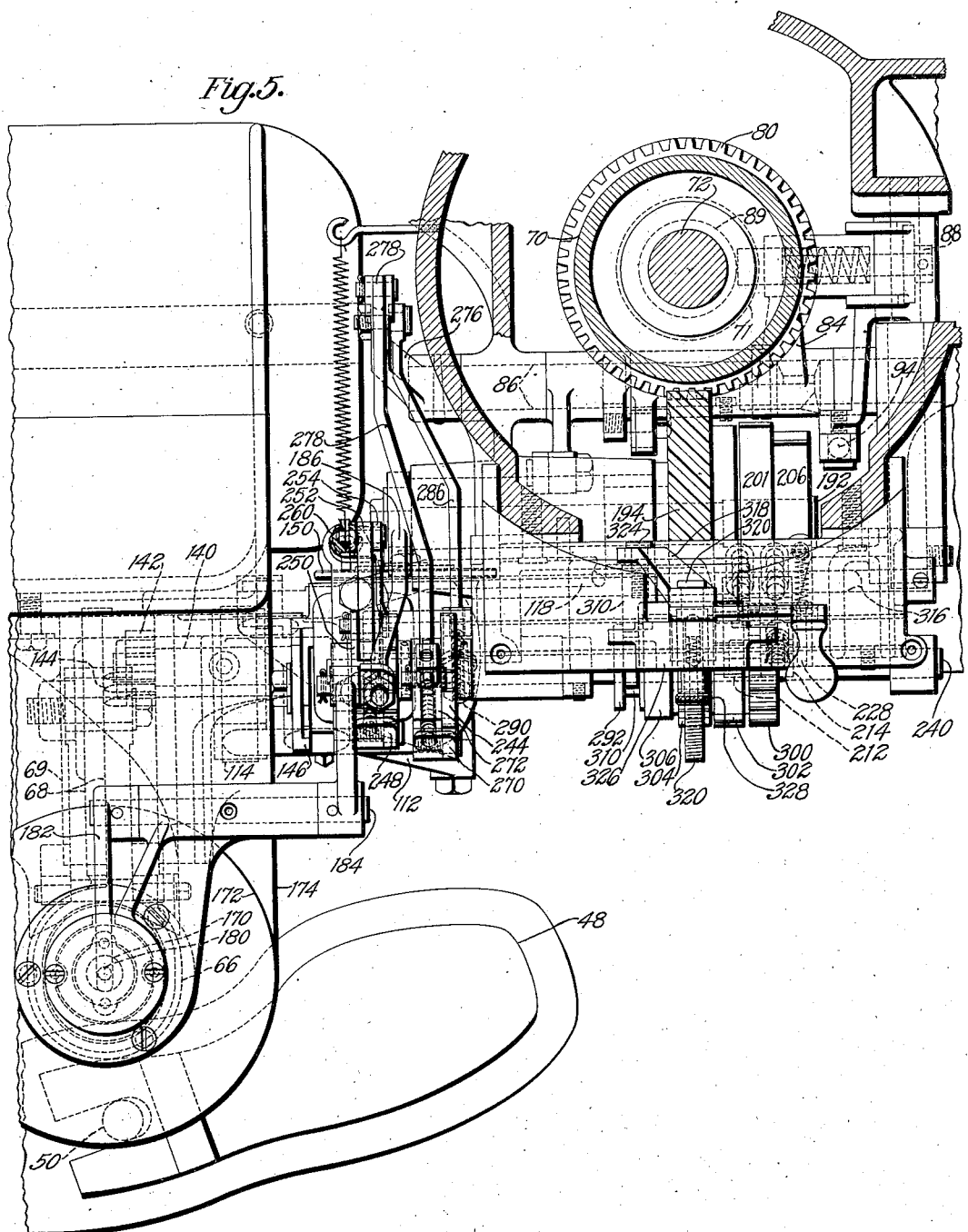
Figure 6:
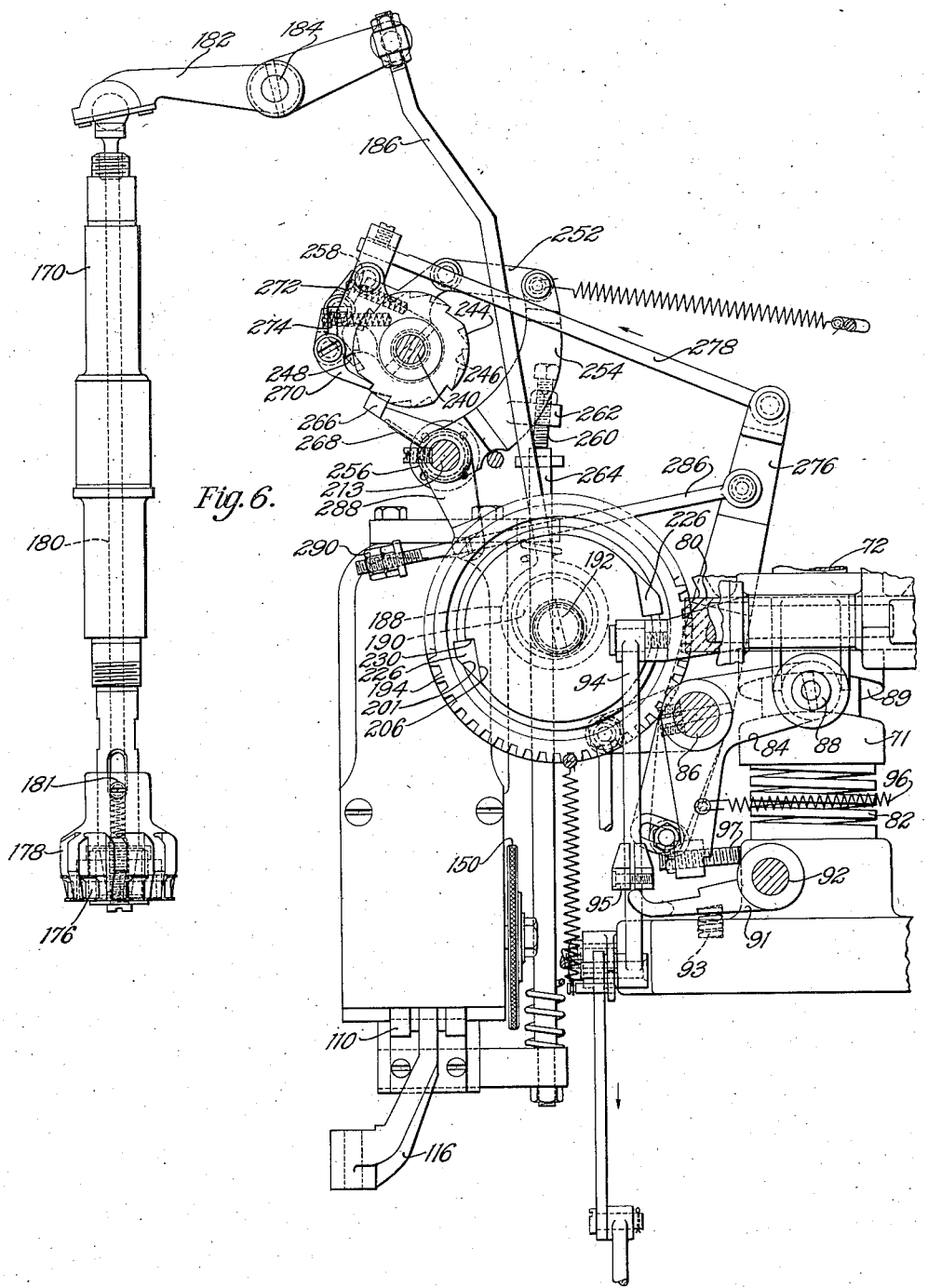
Figure 7:
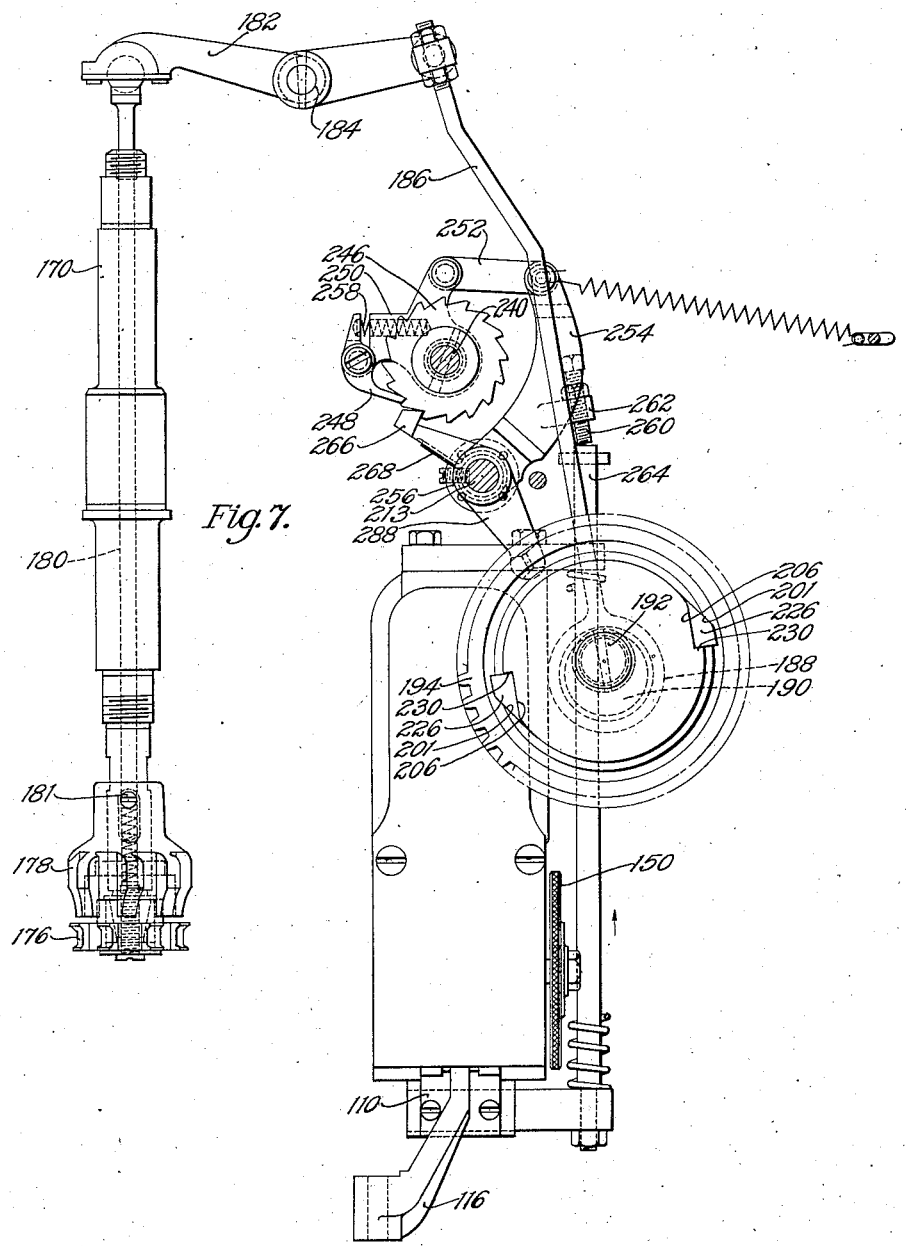
Figure 8:
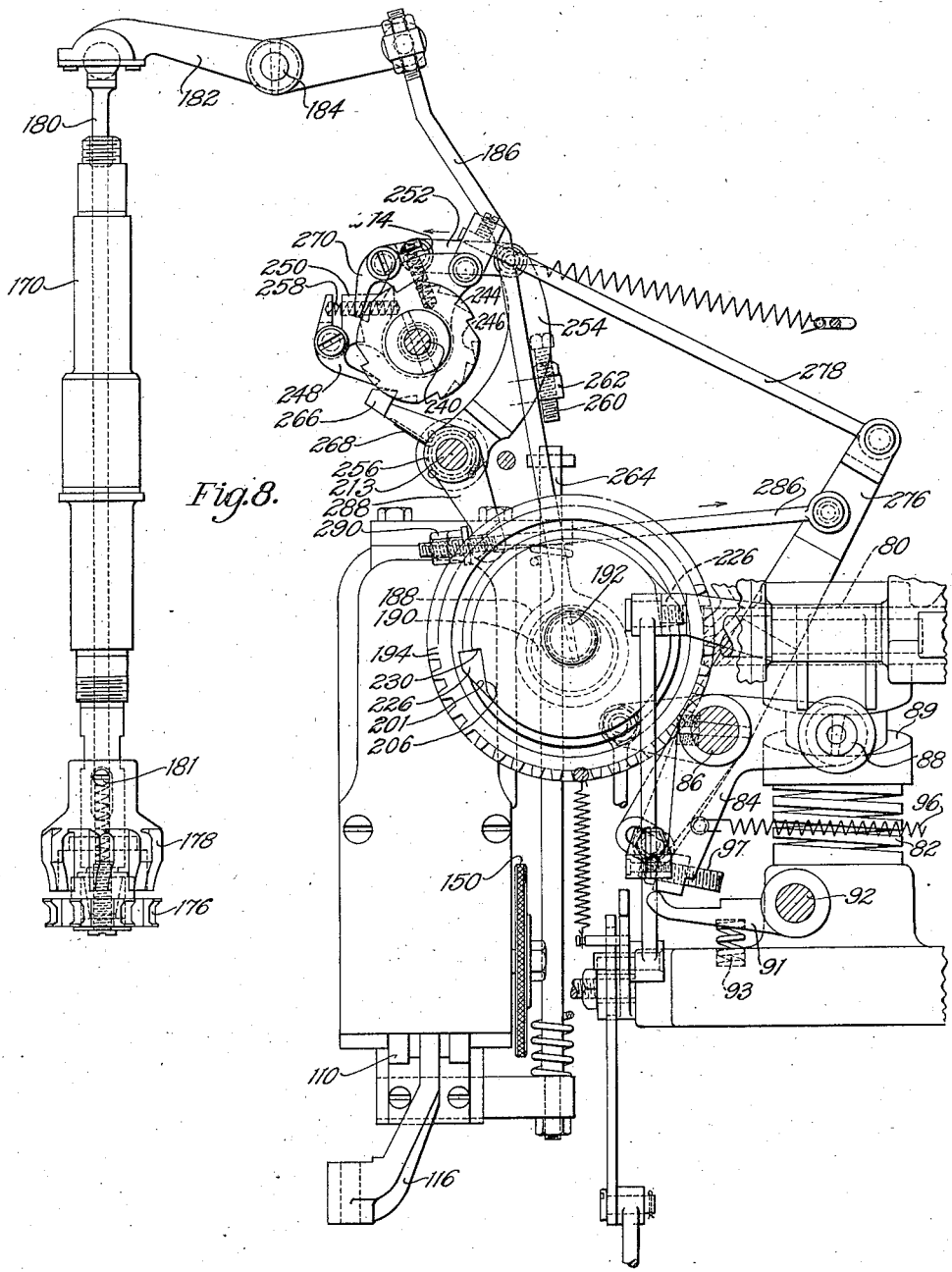
Figure 9:
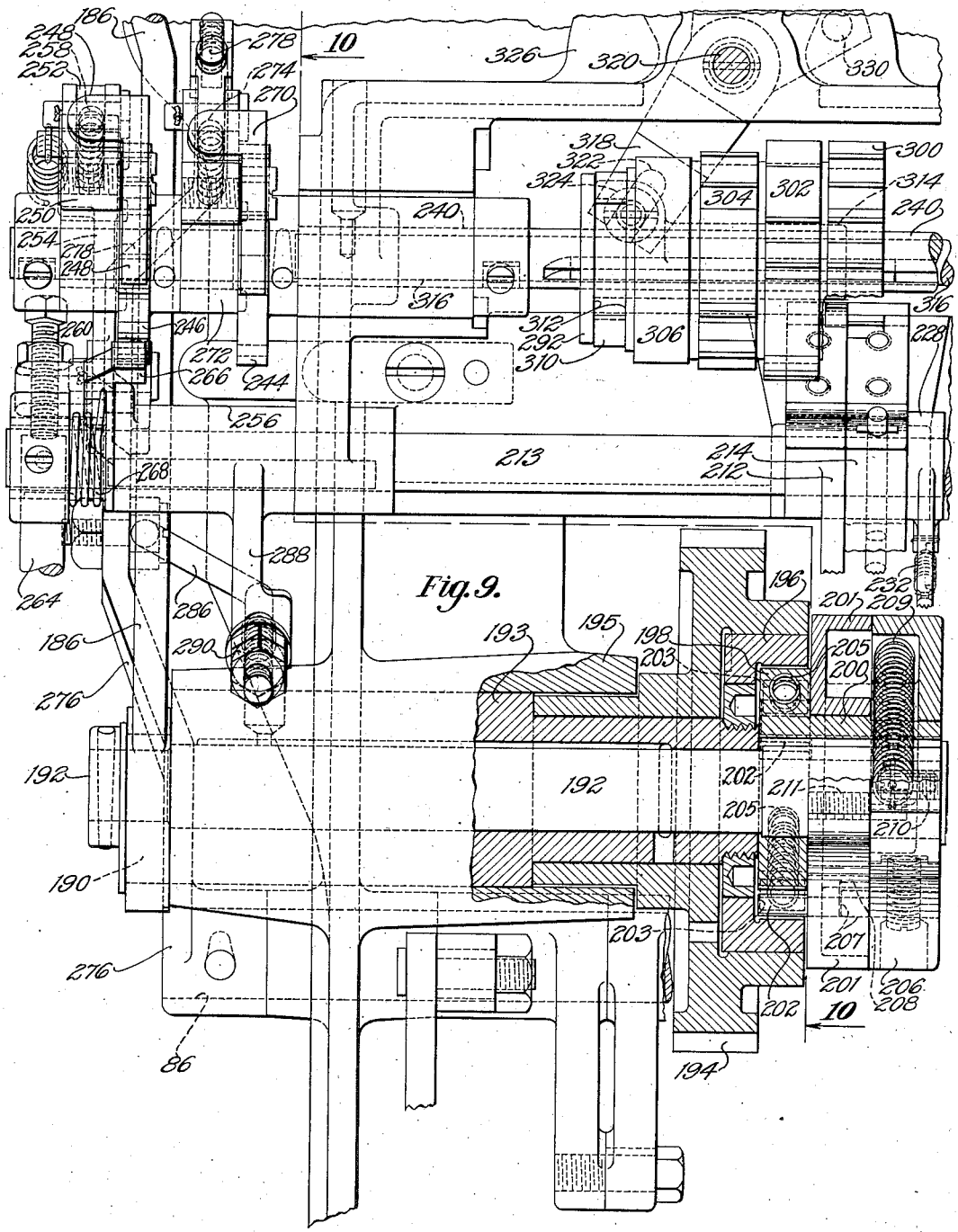
Figure 10:
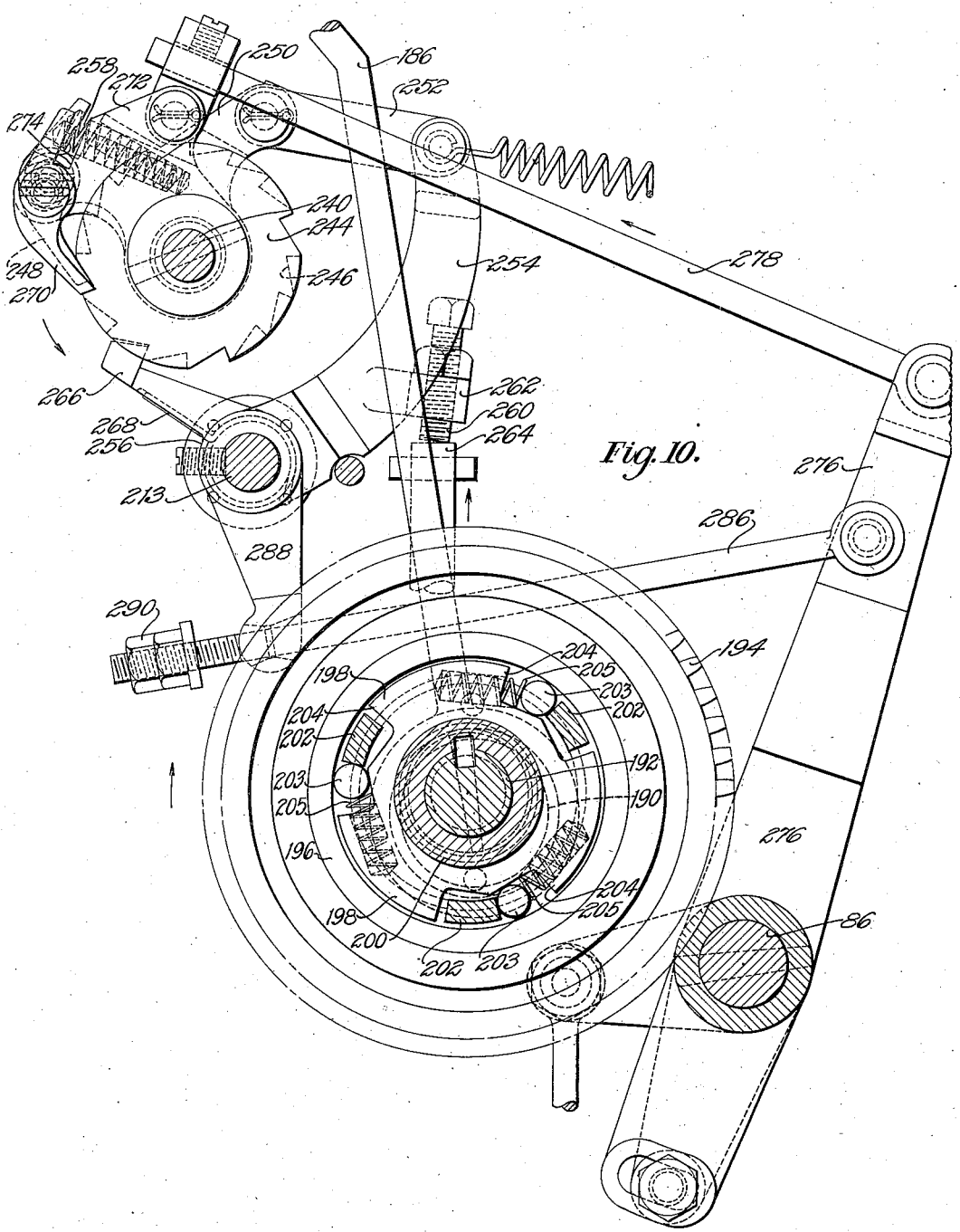

The several features of the present invention consist also in the devices, combinations and arrangement of parts hereinafter described and claimed which, together with the advantages to be obtained thereby, will be readily understood by one skilled in the art from the following description taken in connection with the accompanying drawings in which Fig. 1 is a view in front elevation of an automatic edge trimming machine embodying the several features of the present invention; Fig. 2 is a plan view of the machine with a portion of the casing and the stop motion broken away to show underlying parts; Fig. 3 is a right side elevation of the machine head and stop motion with a portion of the casing removed to show underlying parts; Fig. 4 is a view in front elevation of the machine head illustrating particularly the edge trimming devices, the stop motion and the templet grading device; Fig. 5 is a plan view partly in section to illustrate particularly the parts shown in Figs. 3 and 4; Figs. 6, 7, and 8 are a series of detail views taken in side elevation to illustrate different positions of the mechanism for shifting the cutters, Fig. 6 illustrating the parts in the starting position, Fig. 7 illustrating the forepart edge cutter in operation, and Fig. 8 illustrating the parts in the position taken upon stopping the machine; Fig. 9 is a detail view in front elevation partly in section illustrating particularly the tool selecting mechanism and the Horton clutch controlled thereby for substituting one cutter for the other; Fig. 10 is a sectional view taken on the line 10—10 of Fig. 9; Fig. 11 is a detail view in front elevation similar to Fig. 9, but taken further to the right in the machine; Fig. 12 is a sectional view taken on the line 12—12 of Fig. 11; Fig. 13 is a detail sectional view taken on the line 13—13 of Fig. 11 of the control ratchet for producing a bevel shank inner edge on a left shoe; Fig. 14 is a detail sectional view taken on the line 14—14 of Fig. 11 of the control ratchet for producing a bevel shank inner edge on a right shoe; Fig. 15 is a sectional view similar to Fig. 12, showing the parts in the positions taken during the operation of the Horton clutch; and Fig. 16 is a view similar to Fig. 15 showing the parts in the positions taken just as the clutch is thrown into operation.

The machine illustrated in the drawings as embodying the several features of the present invention is an automatic machine of the type illustrated and described in the applicant's prior Patent No. 1,897,526, dated February 14, 1933, and pending application Serial No. 729,399, filed June 7, 1934, which disclose an automatic edge trimming machine comprising forepart and shank edge trimming cutters for performing an edge trimming operation along the bottom margin of a lasted shoe, a jack upon which the shoe is supported, and means including a templet and templet grading device for automatically controlling the movements of the jack so that no manual manipulation of the shoe by the operator is required during the operation.

The jack of the machine illustrated in the drawings, comprises heel and toe supports 20 and 22 which are supported upon a vertical spindle 24, and which are actuated to clamp a lasted shoe automatically in proper position on the jack when the shoe is placed upon the jack by the operator, and which are automatically actuated at the conclusion of the edge trimming operation to unclamp the shoe. This jack is the same in construction and mode of operation as the jack disclosed in applicant's prior Patent No. 1,689,954, dated October 30, 1928. During the edge trimming operation, the jack is moved in the direction of feed, and is rotated to transfer the point of operation about the shoe from the heel breast of the shoe at one side to the heel breast at the other side, and simultaneously tipping movements are imparted to the jack to compensate for the transverse and longitudinal curvatures of the shoe sole. To enable the jack to be so actuated, it is mounted in the machine in the same manner as the jack of applicant's prior patent above referred to, and is acted upon by mechanism constructed, arranged and operated as the corresponding mechanism of the machine of said patent.

Briefly stated, the jack supporting structure comprises an arm 26 in the forward end of which the lower end of the jack spindle 24 is rotatably mounted by means of a gimbal joint, a support 28 upon which the arm 26 is mounted to swing vertically, and a frame 30 pivotally mounted at its lower end in the machine base so as to be capable of swinging about a horizontal axis, and upon which the support 28 is mounted to swing about a substantially vertical axis. The mechanism for moving the jack in the direction of feed, for rotating the jack, and for imparting tipping movements to the jack, comprises a vertical pattern cam shaft 32 upon which a series of pattern cams 34 are mounted, and connections from the cam shaft to the jack and jack supporting structure comprising the feed lever 36 connected by the link 38 to the toe portion 22 of the jack, the cord 40 passing around a wheel mounted in the forward end of the arm 26 and connected through the gimbal joint to the jack spindle 24, and cam levers 44 and 46 connected respectively to the frame 30 and support 28.

A templet under the guidance of which the edge trimming operation is performed upon a shoe sole, is indicated at 48. This templet consists of a rigid block of wood, the surface of which fits closely against the sole surface. The templet is shaped to extend over the fore part and shank only, and is formed with a peripheral contour having a definite relationship to the outline which the edge of the outsole is to have in these parts of a finished shoe of a predetermined length and width. The templet is located on the shoe by means of a pin 50 projecting from the last through a perforation in the sole of the shoe into a slot 52 formed in the heel end of the templet, and by means of a pin 54 projecting from the sole engaging surface of the templet at its toe portion, and engaging an indentation 56 formed in the surface of the sole. The templet is firmly clamped in position by means of a clamping plate 58 at the lower end of a plunger 60 which is mounted in a vertical guideway in the outer end of a supporting arm 62, and is arranged to be actuated by a manually operated cam lever 64 pivotally mounted on the arm. The arm 62 is pivotally supported at its lower end on the lower part of the heel portion 20 of the jack to permit a swinging movement of the arm into and out of clamping position. When mounted in position on the shoe sole, as shown, for instance in Fig. 2, the edge of the templet is at some distance inside of the sole edge in position to cooperate with an edge guide during the trimming operation.

To cooperate with the templet there is provided a templet guide 66 (see Figs. 3 and 5) which extends around the trimming cutters and is provided at its forward end with a semi-circular bearing surface adapted for engagement with the edge of the templet 48 to determine the position of the sole edge with relation to the cutters as the point of operation is transferred about the shoe. The guide 66 is formed on the forward end of a slide 68 which is mounted in a guideway 69 formed in the machine head and is controlled to determine the contour path followed by the operating devices with relation to the guiding surface of the templet by means of a templet grading device as hereinafter described.

The driving and stopping motion for the present machine is substantially that disclosed in the patent to Topham No. 1,791,176, dated February 3, 1931, and is arranged upon the actuation of the foot treadle by the operator to start the machine to put the edge trimming devices and pattern mechanism in operation to perform an edge trimming operation progressively around the shank and forepart portions of a shoe, thereafter to move the jack and shoe supported therein laterally out of engagement with the trimming cutters, and finally during the continued rotation of the pattern cam shaft through a complete revolution to rotate the jack in a reverse direction to starting position. The stop motion as generally indicated in Figures 1 to 6 of the drawings, comprises a conical shaped clutch member 70 formed on the upper end of a sleeve 71 loosely mounted on the reduced lower end of the main drive shaft 72 of the machine. The clutch member 70 is arranged alternatively for engagement with a driving clutch member 74 secured to the constantly rotating drive shaft 72, and with a fixed braking member 78 arranged for engagement with the outer surface of the clutch. The drive for operating the pattern cam shaft is taken from the sleeve 71 through a spiral gear 80 rigidly secured thereto, and connections which are not here shown inasmuch as these form no part of the present invention. A heavy compression spring 82 mounted in axial alignment beneath the sleeve 71 tends to move the sleeve and clutch member 70 into engagement with the driving member 74. The operation of the main clutch 70 of the machine is controlled by means of a bell-crank lever 84 secured to a rock shaft 86 and provided at one end with a locking bolt 88 which is arranged for engagement with a cam groove 89 formed in the sleeve 71 above described.

With the machine in stop position as illustrated in Fig. 3, the locking bolt 88 is engaged in the cam groove 89, and the bell-crank 84 and rock shaft 86 are latched in stop position with the clutch member 70 depressed into frictional engagement with the brake 78 by means of a latch 91 which is pivoted at 92 on the machine frame and is arranged to contact with an abutment formed on the lower arm of the bell-crank 84. A compression spring 93 seated in a recess in the machine frame to engage the under side of the latch 91 tends to maintain the latch yieldingly in operating position. The latch 91 is tripped and the locking bolt is withdrawn in starting the machine to permit the sleeve 71 and clutch 70 to be raised into operative engagement with the driving clutch member 74 under the pressure of the spring 82 through connections including a vertical control rod 94 which is depressed by the actuation of the starting treadle of the machine. The rod 94 has mounted thereon a lug 95 which is adapted for engagement with the end of the latch 91 and is connected at its upper end to a mechanism for withdrawing the locking bolt not here shown. For a full description of the construction and operation of these parts, reference may be had to the patent to Topham above referred to.

In the operation of the driving and stopping mechanism, as briefly outlined above, the locking bolt lever 84 and rock shaft 86 will have the following movements imparted thereto. When the latch 91 is tripped and the locking bolt 88 is withdrawn in starting the machine, the bell-crank 84 and rock shaft 86 are rocked in a counterclockwise direction, as shown in Figs. 3 and 6 under the pressure of a small tension spring 96 secured to the lower end of the bell-crank 84 to bring an adjustable stop screw 97 into engagement with a fixed portion of the machine frame. Subsequently in stopping the machine at the end of the operation the lock bolt is released and permitted to enter the cam groove 89 so that during the continued rotation of the sleeve 71, the bell-crank 84 and shaft 86 are rocked in a clockwise direction against the pressure of the spring 96 to a limiting position determined by the shape of the groove 89. The bell-crank 84 and rock shaft 86 are then arrested at an intermediate point in their return movement by the engagement of the latch 91 with the lower arm of the bell-crank 84. The further rotation of the sleeve 71 now causes the lock bolt 88 engaging in the groove 89 to depress the sleeve 71 and clutch member 70 against the pressure of the spring 82 so that the clutch member 70 is disengaged from the driving member 74 and is brought into braking engagement with the brake member 78 to stop the machine. It will be evident from the foregoing description of the stop motion that the bell-crank 84 and rock shaft 86 follow a cycle of operations in the operation of the machine which includes a relatively small counterclockwise movement when the lock bolt 88 is withdrawn in starting the machine, and subsequently in stopping the machine is moved a relatively large distance in a clockwise direction, being thereafter returned to the intermediate stopping position as the machine is brought to rest.

There is also provided in the present machine, a templet grading device for controlling the position of the edge gage with relation to the shoe operating means as the point of operation is transferred about the shoe adjustable to cause the operating means to follow any one of several predetermined marginal contour paths corresponding to shoes of different widths with relation to a single templet of standard dimensions for each size or length of shoe. The templet grading device is substantially similar to that described and illustrated in the applicant's pending application Serial No. 729,399, filed June 7, 1934, but may be briefly described as follows: This mechanism as best shown in Figs. 3 and 4, comprises a vertically movable slide 110 which is moved through a predetermined path in timed relation to the transfer of the point of operation around the shoe by means of connections operated from the pattern cam shaft of the machine which comprise a bell-crank lever in the form of a frame 112 pivoted at 114 on the machine frame and having one arm connected by means of a link 116 to the lower end of the slide 110. The downwardly extending arm of the bell-crank or frame 112 is connected by means of a link 118 to an arm 120 secured to a vertical rock shaft 122. A second arm 124 secured to the rock shaft 122 is connected by means of a link 126 to one end of a cam actuated lever 128 which is loosely sleeved to turn on a vertical pivot shaft 130 and at its other end carries a roll 132 adapted to engage with an actuating cam 134 on the pattern cam shaft 32 of the machine.

The vertical movements of the slide 110 are caused to impart positioning movements to the templet guide 66 by means of mechanism which includes a rock shaft 140 provided at one end with a gear segment 142 arranged to mesh with a rack 144 formed on the templet guide slide 68, and at its other end provided with an adjustable lever arm 146, which has pivotally secured thereto a guide block adapted to slide in a track formed in a guide lever 148 pivotally secured to the slide 110. The direction and extent of the movements imparted to the lever 146 and rock shaft 140 to position the templet guide 66 by the vertical movements of the slide 110 is adjustably determined by the angular position of the guide lever 148. This adjustment may be readily determined by the operator through the positioning of an index wheel 150 supported on one end of a worm shaft 152 which has mounted thereon a worm 154 arranged for engagement with a corresponding worm gear segment 156 on a downwardly extending arm of the guide lever 148.

The trimming cutters are mounted on the lower end of a vertical shaft 170 which comprises the armature shaft of an electric motor 172 supported on a bracket 174 which forms part of the machine head. The cutters comprise a forepart edge trimming cutter 176 rigidly secured to the shaft and a shank edge trimming cutter 178 which is keyed to slide on the shaft and has cutting teeth arranged for telescoping movement between the teeth of the forepart cutter 176. The shank edge cutter 178 is moved vertically into and out of operating position by means of a small shaft 180 which extends through an axial bore formed in the armature shaft 170 and is connected at its lower end to the shank cutter 178 by means of a pin 181 which extends through a slotted portion of the armature shaft 170.

The positions of the central shaft 180 and shank cutter 178 are controlled to maintain the one or the other of the cutters in operating position, as best shown in Figs. 6 to 8 inclusive, through connections which include a lever 182 pivoted at 184 on the machine head and connected at one end by means of a ball bearing joint to the upper end of the central shaft 180 and at its other end to a link 186 which has formed at its lower end a ring 188 fitted over an eccentric 190 driven by a half revolution clutch as hereinafter described.

In accordance with the several features of the invention, the machine herein disclosed is provided with a novel and improved mechanism for automatically substituting the shank and forepart edge cutters one for the other at predetermined positions in the transfer of the point of operation about the shoe. For simplicity in construction and also to permit a greater latitude of operation, a tool selecting mechanism is provided which is controlled by the operation of the stop motion of the machine in starting and stopping the machine and by the operation of the slide 110 of the templet grading device to effect the required substitutions of one cutter for the other without the necessity of the separate train of mechanism and cam on the pattern cam shaft of the machine previously employed for this purpose. The mechanism herein disclosed is also arranged to permit the operator by means of a simple adjustment to set the machine for automatic operation to produce a bevelled cut along the inside shank portion only of either a right or left shoe, or upon both sides of the shank, or to produce only a vertically trimmed edge around the entire extent of the shank and forepart of the shoe as the case may be.

The mechanism for shifting the cutters one for the other, as best shown in Figs. 9 and 10, comprises a laterally extending shaft 192 which is mounted within a sleeve bushing 193 supported on a bearing bracket 195, on one end of which is mounted the eccentric 190 above described, a continuously driven spiral gear 194 loosely mounted to turn on a portion of the sleeve bushing 193, and a half revolution Horton clutch which is adapted when tripped into operation to drive the shaft 192 and eccentric 190 mounted thereon through one-half revolution to move the shank cutter 178 alternately into and out of operating position. The gear 194 meshes with the continuously driven spiral gear 80 of the stop motion. The parts of the Horton clutch comprise a driving member in the form of a ring or flange 196 secured to rotate with the gear 194, a driven member in the form of a clutch disk 198 formed on a sleeve 200 keyed to rotate with the shaft 192 and located within the driving ring 196, and a clutch control drum 201 which is provided upon one face thereof with lugs 202 which are arranged for engagement with spring-pressed locking rolls 203 mounted in cam-shaped recesses 204 formed in the periphery of the driven clutch disk 198. When the control drum 201 is locked in rest position, the lugs 202 act to engage with and force the rolls 203 against the pressure of their springs 205 into the deep portions of the recess 204, so that the driving ring 196 is permitted to rotate freely with relation to the clutch disk 198.

The clutch control drum 201 is connected to turn with the driven clutch disk 198 and shaft 192 and is permitted a slight yielding movement with relation thereto to take up the shock of suddenly arresting the rotation of the control drum 201 at the end of a half revolution of the Horton clutch as hereinafter described by means of connections including a drum 206 which is rigidly secured to the sleeve 200 adjacent the clutch control drum 201, and has formed on one face thereof a pin 207 arranged to engage with a slot 208 in the adjacent face of the control drum 201. A tension spring 209 mounted in an arcuate groove formed in the face of the drum 206 and connected at one end to a pin 210 on the drum 206 and at its other end to a pin 211 on the control drum 201 tends normally to maintain the control drum 201 in a retarded angular position with relation to the drum 206 in engagement with the rear or following end of the slot 208 considered with relation to the direction of rotation of the parts. With this arrangement of the parts it will readily be seen that the sudden stopping of the control drum 201 at the end of a half revolution of the Horton clutch will cause the shock of arresting the rotational movement of the shaft 192 and drum 206 to be taken up by the action of the spring 209 as the pin 207 travels from the rear end to the leading end of its slot 208 in the control disk 201.

The operation of the clutch is controlled by means of a system of stopping and locking pawls which are arranged to control the operation of the clutch control drum 201 and the drum 206. These pawls as best shown in Figs. 11, 12, 15, and 16, comprise a stop pawl 212 pivotally mounted on a rock shaft 213, and a spring cushioned stop pawl 214 pivoted on the shaft 213 adjacent the pawl 212. The stop pawl 214 carries at its lower end a plunger 216 which is formed on the end of a plunger shaft 218 extending through a bore in the pawl 214 and is held yieldingly in an advanced position by means of a compression spring 220 coiled about the shaft 218 within an enlarged portion 222 of the bore. A cross pin 224 fitted into the upper end of the shaft 218 is arranged for engagement with the adjacent surface of the pawl 214 to limit the downward movement of the plunger 216 under the pressure of its spring 220. The pawls 212 and 214 are arranged for engagement with either of two oppositely located shoulders 226 on the clutch control drum 201. When the pawls are momentarily tripped out of engagement with one of the shoulders 226, the rolls 203 are permitted to move under the pressure of their springs 205 into locking engagement with the driving clutch band 196 to rotate the clutch disk 198 and the drums 201 and 206. At the end of a half revolution the opposite shoulder 226 will be engaged by the spring plunger 216 of the pawl 214 to yieldingly arrest the rotation of the drum 201 which is then positively stopped by subsequent engagement with the pawl 212 and acts through the yielding connection with the drum 206 above described to arrest the rotation of the shaft 192 and eccentric 190. Each of the pawls 212 and 214 is provided with upwardly extending arms with V-shaped lugs for engagement with ratchet teeth forming part of a selecting mechanism hereinafter to be described. There is provided with each pawl a compression spring 227 which is seated in a recess in the machine frame and engages with the upwardly extending arm of the corresponding pawl to maintain the pawls normally in engagement with the drum 201.

The manner in which the pawls 212 and 214 are tripped to turn the clutch through a half revolution is best illustrated in Figs. 12, 15, and 16 of the drawings. The V-shaped lugs of the two pawls are arranged for engagement with the ratchet teeth of any one of several selector ratchet disks which may be placed alternatively in operating position and are given a step-by-step rotation to control the operation of the half revolution clutch at predetermined points in the transfer of the point of operation about the shoe as hereinafter to be described. It will be noted that the V-shaped lugs of the two stop pawls will be engaged by the same ratchet tooth on whichever of the control disks is in operating position, the lug on the spring cushioned stop pawl 214 being located somewhat in advance of the lug on the pawl 212. Starting from the rest position illustrated in Fig. 12, the advance of the ratchet disk 300 illustrated in the drawings in operating position and hereinafter to be more fully described through a sixteenth of a revolution, causes the lugs to be engaged by and to ride onto the next adjacent ratchet tooth, the spring cushioned stop pawl 214 being raised and thereafter released in advance of the pawl 212 as shown in Figs. 15 and 16, so that ample time is provided to permit the pawl 214 to move back into operating position in the path of the opposite shoulder 226 before the clutch drum 201 is released and rotated through a half revolution with the driving member 194. As the spring cushioned stop pawl 214 is raised by the action of the ratchet tooth, the plunger 216 released from engagement with the lug 226 is permitted to advance under the pressure of its spring 220 and overlie the lug 226 to prevent the return of the pawl 214 to locking position prior to the release of the clutch by the actuation of the locking pawl 212. The pawl 212 is subsequently raised by the action of the ratchet tooth to permit the movement of the control drum 201 and shaft 192 through a half revolution and is then released so that the parts are again brought to the rest position shown in Fig. 12.

The shaft 192, eccentric 190 and the several parts of the Horton clutch including the driven clutch disk 198 and control drum 201 are positively held against movement in a reverse direction from their stop position by the operation of a locking pawl 228 which is pivotally mounted on the shaft 213 and is arranged for locking engagement with either of two shoulders 230 formed on the drum 206. A tension spring 232 secured at one end to the pawl and at its other end to a lug 234 on the machine frame serves to hold the locking pawl yieldingly against the drum. With this arrangement of the locking pawl 228 it will be seen that as the control drum 201 is stopped by the operation of the pawls 212 and 214, the drum 206 and shaft 192 will be carried slightly beyond stop position against the cushioning force of the spring 209 so that the locking pawl 228 is permitted to drop behind the corresponding shoulder 230 to arrest the return movement of the drum 206 and shaft 192 under the influence of the spring 209.

The operation of the pawls 212 and 214 for controlling the operation of the clutch to drive the shaft 192 and eccentric 190 through successive half revolutions is controlled by means of a cutter selecting mechanism which is operated during each cycle of operations around the shoe sole by means of connections controlled from the starting and stopping mechanism of the machine and the templet grading device above described. The cutter selecting mechanism comprises a selector shaft 240 and a clutch pawl ratchet trip mechanism actuated by the rotation of the selector shaft 240 as hereinafter described, to engage with and trip the V-shaped lugs of the control pawls 212 and 214.

During each cycle of operations of the machine to perform a trimming operation on a shoe, the selector shaft 240 is rotated through one-quarter of a complete revolution in four successive steps by means of two pawl and ratchet mechanisms which are controlled from the starting and stopping motion of the machine and the templet grading device so that each of the advancing movements takes place at a predetermined point in the transfer of the point of operation about the shoe. These mechanisms comprise a four-tooth ratchet 244 and a 16-tooth ratchet 246 rigidly secured to the selector shaft 240. The 16-tooth ratchet is actuated, as best shown in Figs. 7 and 9, by means of a pawl 248 pivotally mounted on a rocker arm 250 which is loosely mounted to turn on the shaft 240 and is provided with an upwardly extending arm which is connected by means of a link 252 to a control lever 254 secured to a sleeve hub 256 loosely mounted to turn on the pivot shaft 213. A compression spring 258 seated in a recess formed in the pawl lever 250 engages with a tail of the pawl 248 to hold the pawl yieldingly in engagement with the ratchet 246. The lever 254 and sleeve hub 256 are rocked to advance the ratchet 246 and selector shaft 240 the distance of a single tooth at two separate points in the transfer of the point of operation around the shoe by the engagement of an adjustable stop pin 260 screw-threaded in a lug 262 formed on the lever arm 254 with the upper end of a shaft 264 which is mounted for vertical movement with the templet grader slide 110. The actuating cam for the templet grader slide 110 is so designed that the slide 110 and shaft 264 reach an extreme high position as the point of operation passes from the shank to the ball portion of the shoe, and again as the point of operation passes from the ball to the shank portion of the sole so that the pawl 248 actuated through the mechanism described will operate to rotate the selector shaft 240 the distance of a single tooth or one-sixteenth of a complete revolution at each of these points in the transfer of the point of operation about the shoe. To prevent possible movement of the shaft 240 in reverse direction, a locking pawl 266 is loosely mounted on the pivot shaft 213, and is held yieldingly in engagement with the 16-tooth ratchet 246 by means of a spring 268 coiled about the pivot shaft 213 and having one end thereof engaging under the pawl.

The selector shaft 240 is advanced through a sixteenth of a revolution upon the starting of the machine through mechanism which is controlled from the stop motion of the machine and is arranged to operate in conjunction with the 4-tooth ratchet 244 secured to the selector shaft 240. This mechanism, as best shown in Figs. 6, 8, 9, and 10, comprises a pawl 270 which is pivotally mounted on a pawl rocker arm 272 loosely mounted to turn on the selector shaft 240 and is held yieldingly in engagement with the 4-tooth ratchet 244 by the engagement of a compression spring 274 seated in a recess in the rocker arm 272 with a tail of the pawl 270. The movement of the rocker arm 272 and pawl 270 to advance the ratchet one-sixteenth of a revolution in starting the machine is controlled by means of a lever arm 276 (see Figs. 6, 8, and 10) secured to turn with the rock shaft 86 and bell-crank locking bolt lever 84, and connected at its upper end by means of a link 278 to an upwardly extending portion of the pawl rocker arm 272. With this arrangement of the parts, it will readily be seen that the initial movement of the locking bolt lever 84 and rock shaft 86 in a counterclockwise direction as the locking bolt is released in starting the machine will operate to advance the pawl 270 and ratchet 244 to rotate the selector shaft 240 through one-sixteenth of a revolution.

The movement of the controlling lever 276 with the locking bolt lever 84 and rock shaft 86 is rendered operative in stopping the machine to again advance the selector shaft 240 through a sixteenth of a revolution through connections which are arranged to impart another advancing movement to the pawl 248 engaging the 16-tooth ratchet 246. These connections comprise a link 286 connected at one end to the lever 276 and at its other end arranged to pass through a hole formed in a downwardly extending arm 288 rigidly secured to turn with the sleeve 256. A stop nut 290 screw-threaded to the end of the link 286 is arranged upon movement of the control lever 276 to the right as the locking bolt lever 84 and shaft 86 are rotated to their extreme position in clockwise direction upon stopping the machine to engage with and rock the lever arm 288, the sleeve 256 and control lever 254 to advance the pawl 248 and 16-tooth ratchet 246 through another one-sixteenth of a revolution. It will be noted that the position of the stop nut 290 on the link 286 is adjusted to provide a certain amount of lost motion so that the stop nut 290 is brought into engagement with the lever arm 288 to advance the pawl only during the extreme movement of the lever arm 276 to the right with the lock bolt in stopping the machine.

The step-by-step rotation of the selector shaft 240 through one-sixteenth of a revolution as above described at each of four predetermined points in the transfer of the point of operation about the shoe, first when the machine is put in operation, again at each of the points where the point of operation passes from the shank to the ball portion of the shoe sole, and vice versa, and again as the machine is brought to rest, is utilized to determine at each of these positions the selection of the cutter which is to be used in the trimming of the suceeding portion of the shoe sole.

The rotational movements of the selector shaft 240 are rendered operative to control the operation of the clutch pawls 212 and 214 by means of a clutch pawl ratchet trip mechanism which comprises a sleeve 292 keyed to turn with and to slide axially of the selector shaft 240, and four clutch pawl control disks as designated at 300, 302, 304, and 306 secured to the sleeve 292. The control disks are arranged to be placed alternatively in operative relationship to the pawls 212 and 214 by means of a simple adjustment of the position of the sleeve 292 axially as hereinafter more fully set forth.

The control disk 300 is arranged when placed in operating position to cause the shank cutter to be thrown into operation to secure a bevel edge on both sides of the shank of either a right or left shoe. To this end the control disk 300 is provided with 16 ratchet teeth arranged to engage with and trip the pawls 212 and 214 with each successive advance of the selector shaft 240 so that the clutch will act upon the starting of the machine to move the shank cutter downwardly into operating position, will be actuated as the point of operation reaches the ball portion of the foot to raise the shank cutter out of operating position, will be actuated as the point of operation passes from the ball to the shank portion of the foot to move the shank cutter into operation, being finally again actuated as the machine is brought to rest to retract the shank cutter out of operation.

The disk 302 is arranged to cause the shank cutting tool to be thrown into operation to form a bevel edge only on the inside shank edge of a right shoe. This disk has eight ratchet teeth formed thereon which are arranged in groups of two to cause the pawls 212 and 214 to be tripped only during the third and fourth advancing steps of the selector shaft 240 during each operation on the shoe. With the disk 302 in operating position the pawls 212 and 214 will be engaged only by a smooth portion of the disk during the first and second advancing steps of the selector shaft 240 in starting the machine and, as the point of operation passes from the shank to the ball portion of the sole so that the shank cutter is left in its inoperative position. As the point of operation passes again from the ball about the shank portion of the shoe, the pawls will be engaged by the first of the two ratchet teeth to operate the clutch and cause the shank cutter to be lowered into operating position. The fourth advancing step of the selector shaft 240 as the machine comes to rest then causes the second tooth of the active group to again trip the pawls 212 and 214 to return the shank cutter to its raised inoperative position.

The disk 304 is arranged to cause the shank acting tool to be thrown into operation to form a bevel edge only on the inside shank edge of a left shoe. This disk has eight ratchet teeth formed thereon which are arranged in groups of two to cause the pawls 212 and 214 to be tripped only during the first and second advancing steps of the selector shaft 240 during each operation on the shoe. During the operation on the shoe the pawls 212 and 214 will be engaged by the first ratchet teeth of the operating group upon the first advancing step of the selector shaft 240 in starting the machine to lower the shank cutter into operating position and will be again actuated by the second tooth of the group upon a second advancing step of the selector shaft 240 to raise the shank cutter to inoperative position as the point of operation passes from the shank to the ball portion of a shoe sole. During the third and fourth advancing steps of the selector shaft 240 the pawls 212 and 214 will be riding on a smooth portion of the disk 304 so that the shank cutter is maintained out of operation during the remaining portion of the operation about the shoe sole.

For the formation of a vertical edge trimming cut entirely around the shank and forepart portions of the shoe, a smooth disk 306 is provided for cooperative engagement with the pawls 212 and 214. The disk 306 has no ratchet teeth formed thereon so that the pawls 212 and 214 will not be tripped during any one of the four advancing steps of the selector shaft 240 and the shank edge cutter will be maintained in its inoperative position during the entire edge trimming operation about the shoe.

With the present construction mechanism is provided which is readily adjustable by the operator to shift one or another of the disks 300, 302, 304, and 306 into operating position in accordance with the requirements of the work being operated upon. This mechanism comprises a shifting yoke 310 (see Figs. 9, 11, and 12) which engages with a groove 312 formed in the sleeve 292 which carries the several clutch pawl control ratchets and is secured to a sleeve 314 loosely sleeved to slide on a shaft 316 mounted parallel to the selector shaft 240. The position of the sleeve 314 axially on the guide shaft 316 is controlled by means of a shifting lever 318 mounted to turn about a pivot shaft 320 and provided at its lower end with a slot 322 arranged for engagement with the pin 324 secured to a lug on the sleeve 314. An upwardly extending arm of the shifting lever 318 is provided with a manually operable handle which rises above a semicircular dial 326 formed on the frame of the machine. The shifting lever 318 is maintained in adjusted position by engagement of a spring-pressed detent plunger 328 mounted on the dial 326 with any one of several recesses 330 formed in the adjacent face of the shifting lever 318. As will readily be seen in Fig. 11, the several operating positions of the shifting lever 318 are marked on the face of the dial 326 for the assistance of the operator in setting up the machine for operation on a particular shoe. As shown in Fig. 11, the shifting lever 318 is set with the 16-tooth ratchet disk 300 in operating position to form a bevelled shank edge on both sides of either a left or a right shoe.

The nature and scope of the invention having been indicated, and a particular embodiment of the invention having been specifically described, what is claimed is:

1. A machine for operating upon shoes having, in combination, two tools arranged alternatively to operate upon the sole margin of a shoe, a shoe supporting jack, means for imparting relative positioning movements to the tools and to the jack to transfer the point of operation around a shoe supported on the jack, a templet fixed with relation to the jack and shoe supported thereon, a shoe grading mechanism cooperating with said templet for causing said tools to follow a predetermined contour with relation to said templet and comprising a member movable in accordance with a predetermined pattern during the transfer of the point of operation about the shoe, a stop motion for the machine, means for relatively moving the tools and the jack to locate the tools interchangeably in operating position, and a control device actuated by said stop motion and by said grading mechanism for substituting said tools one for the other at predetermined positions during the transfer of the point of operation about the shoe.

2. A machine for operating upon shoes having, in combination, two tools arranged alternatively to operate upon the sole margin of a shoe, a shoe supporting jack, means for imparting relative positioning movements to the tools and to the jack to transfer the point of operation around a shoe supported on the jack, a templet fixed with relation to the jack and shoe supported thereon, a shoe grading mechanism cooperating with said templet for causing said tools to follow a predetermined contour with relation to said templet and comprising a member movable in accordance with a predetermined pattern during the transfer of the point of operation about the shoe, a stop motion for the machine, means for relatively moving the tools and the jack to locate the tools interchangeably in operating position, mechanism actuated by the operation of said stop motion in starting and stopping the machine to substitute one tool for the other in operating position, and mechanism controlled by said grading device at predetermined points in the transfer of the operation about the shoe to effect the substitution of one tool for the other in operating position.

3. A machine for operating on shoes having, in combination, a forepart edge tool, a shank edge tool, a shoe supporting jack, means for imparting relative positioning movements to the tool and to the jack to transfer the point of operation around the sole of a shoe supported on the jack, guiding means for positioning the shoe sole with relation to the tools comprising a member movable in accordance with a predetermined pattern during the transfer of the point of operation about the shoe, means for relatively moving the tools and jack to locate the tools interchangeably in operating position, a stop motion for the machine, and a control device actuated by said stop motion and by said guiding means for substituting said tools one for the other at predetermined positions during the transfer of the point of operation about the shoe.

4. A machine for operating upon shoes having, in combination, a forepart edge tool, a shank edge tool, a shoe supporting jack, means for imparting relative positioning movements to the tool and to the jack to transfer the point of operation around the sole of a shoe supported on the jack, a templet fixed with relation to the jack and shoe supported thereon, a shoe grading mechanism cooperating with said templet for causing said tools to follow a predetermined contour with relation to said templet and comprising a member movable in accordance with a predetermined pattern during the transfer of the point of operation about the shoe, a stop motion for the machine, and a control device actuated by said stop motion and by said grading mechanism for substituting said tools one for the other at predetermined positions during the transfer of the point of operation about the shoe.

5. A machine for operating upon shoes having, in combination, a forepart edge tool, a shank edge tool, a shoe supporting jack, means for imparting relative positioning movements to the tool and to the jack to transfer the point of operation around the sole of a shoe supported on the jack, a templet fixed with relation to the jack and shoe supported thereon, a shoe grading mechanism cooperating with said templet for causing said tools to follow a predetermined contour with relation to said templet and comprising a member movable in accordance with a predetermined pattern during the transfer of the point of operation about the shoe, a stop motion for the machine, means controlled by said stop motion in starting the machine to locate said shank edge tool in operating position and in stopping the machine to locate said forepart edge tool in operating position, and connections controlled by said grading mechanism to substitute one of said tools for the other at predetermined points in the transfer of the point of operation about the shoe.

6. A machine for operating on shoes having, in combination, a forepart edge tool, a shank edge tool, a shoe supporting jack, means for imparting relative positioning movements to the tool and to the jack to transfer the point of operation around the sole of the shoe supported on the jack, a templet fixed with relation to the jack and shoe supported thereon, a part revolution clutch, connections rendered operative by successive actuations of said clutch to locate alternately one and then the other of said tools in operating position, and a tool selector mechanism comprising a control cylinder, connections between the cylinder and clutch for actuating said clutch, and selector devices for causing said cylinder to actuate the clutch to substitute one tool for the other at a predetermined point in the transfer of the point of operation about the shoe.

7. A machine for operating on shoes having, in combination, a forepart edge tool, a shank edge tool, a shoe supporting jack, means for imparting relative positioning movements to the tool and to the jack to transfer the point of operation around the sole of a shoe supported on the jack, a control device acting when rendered operative to substitute one of said tools for the other in operating position comprising a part revolution clutch, and connections including an eccentric cam rendered operative by successive actuations of said clutch to locate alternately one and then the other of said tools in operating position, and a tool selecting mechanism comprising a clutch control cylinder, connections between the cylinder and the clutch for actuating the clutch, and selector devices for actuating said cylinder at predetermined points in the transfer of the point of operation around the shoe.

8. A machine for operating on shoes having, in combination, a forepart edge tool, a shank edge tool, a shoe supporting jack, means for imparting relative positioning movements to the tool and to the jack to transfer the point of operation around the sole of the shoe supported on the jack, a templet fixed with relation to the jack and shoe supported thereon, a shoe grading mechanism cooperating with said templet for causing said tools to follow a predetermined contour with relation to said templet and comprising a member movable in accordance with a predetermined pattern during the transfer of the point of operation about the shoe, a stop motion for the machine, a part revolution clutch, connections including an eccentric cam rendered operative by successive actuations of said clutch to locate alternately one and then the other of said tools in operating position, a tool selector mechanism comprising a control cylinder for actuating said clutch, and selector devices actuated by said grading device and stop motion to cause the cylinder to actuate the clutch at predetermined points in the transfer of the point of operation about the shoe.

9. A machine for operating on shoes having, in combination, a forepart edge tool, a shank edge tool, a shoe supporting jack, means for imparting relative positioning movements to the tool and to the jack to transfer the point of operation around the sole of the shoe supported on the jack, a templet fixed with relation to the jack and shoe supported thereon, a shoe grading mechanism cooperating with said templet for causing said tools to follow a predetermined contour with relation to said templet and comprising a member movable in accordance with a predetermined pattern during the transfer of the point of operation about the shoe, a stop motion for the machine, a control device acting when rendered operative to substitute one tool for the other in operating position comprising a part revolution clutch, connections including an eccentric cam rendered operative by successive actuations of said clutch to locate alternately one and then the other of said tools in operating position, a tool selecting mechanism comprising a selector shaft, a ratchet cylinder mounted thereon, connections from the ratchet cylinder to the clutch for actuating the clutch, a selector ratchet and pawl mechanism for imparting a rotational movement to said shaft and cylinder controlled by said stop motion, and a pawl and ratchet mechanism for actuating said shaft and cylinder controlled by said grading device.

10. A machine for operating on shoes having, in combination, a forepart edge tool, a shank edge tool, means for guiding the shoe with relation to said tools in the transfer of the point of operation around the shoe sole, a control device acting when rendered operative to locate alternately one or the other of said tools in operating position, a tool selecting mechanism for actuating said control device at predetermined points in the transfer of the point of operation around the shoe to substitute one of said tools for the other, and means for adjusting said selecting mechanism to determine the tool selected thereby for operation on predetermined portions of the margin of the shoe sole.

11. An edge trimming machine for performing a trimming operation around the shank and forepart portions of the sole of a shoe having, in combination, a forepart edge tool, a shank edge tool, means for guiding the shoe with relation to said tools in the transfer of the point of operation around the shoe sole, a control device for locating alternately one or the other of said tools in operating position, a tool selecting mechanism for actuating said device to locate said forepart edge tool in operating position during the operation on the forepart of the shoe sole, and said shank edge tool in operating position during the operation on the shank edges of the shoe sole, and means for adjusting said selecting mechanism alternatively to locate said shank edge tool in operating position for shank trimming both shank edges or for shank trimming either the right or left shank edge only during the transfer of the point of operation about the shoe.

12. An edge trimming machine for performing a trimming operation around the shank and forepart portions of the sole of a shoe having, in combination, a forepart edge tool, a shank edge tool, means for guiding the shoe with relation to said tools in the transfer of the point of operation around the shoe sole, a control device for locating alternately one or the other of said tools in operating position, a tool selecting mechanism for actuating said device to locate said forepart edge tool in operating position during the operation on the forepart of the shoe sole, and said shank edge tool in operating position during the operation on the shank edges of the shoe sole, and means for adjusting said selecting mechanism to determine the tool selected for operation on each of said shank portions of the shoe.

13. A machine for operating on shoes having, in combination, a forepart edge tool, a shank edge tool, a shoe supporting jack, means for imparting relative positioning movements to the tool and to the jack to transfer the point of operation around the sole of a shoe supported on the jack, a control device for locating alternately one or the other of said tools in operating position, a tool selecting mechanism for actuating said device to locate said forepart edge tool in operating position during the operation on the forepart of a shoe sole, and said shank edge tool in operating position during the operation on the shank edges of the shoe sole, and means for adjusting said selecting mechanism to determine the tool selected for operation on each of said shank portions of the shoe.

14. A machine for operating on shoes having, in combination, a forepart edge tool, a shank edge tool, a shoe supporting jack, means for imparting relative positioning movements to the tool and to the jack to transfer the point of operation around the sole of a shoe supported on the jack, a control device for locating alternately one or the other of said tools in operating position, a tool selecting mechanism for actuating said device to locate said forepart edge tool in operating position during the operation on the forepart of a shoe sole, and said shank edge tool in operating position during the operation on the shank edges of the shoe sole, and means for adjusting said selecting mechanism to locate said shank cutter in operating position to trim both shank edges of a shoe or to locate said shank cutter in operating position only to trim the inner shank edge of a right or left shoe, or to maintain said forepart edge tool in operating position during the entire edge trimming operation.

15. A machine for operating on shoes having, in combination, a forepart edge tool, a shank edge tool, a shoe supporting jack, means for imparting relative positioning movements to the tool and to the jack to transfer the point of operation around the sole of a shoe supported on the jack, a control device acting when rendered operative to locate alternately one or the other of said tools in operating position, a tool selecting mechanism for actuating said control device at predetermined points in the transfer of the point of operation around the shoe to substitute one of said tools for the other, and means for adjusting said selecting mechanism to determine the tool selected thereby for operation on predetermined portions of the margin of the shoe sole.

16. A machine for operating on shoes having, in combination, a forepart edge tool, a shank edge tool, a shoe supporting jack, means for imparting relative positioning movements to the tool and to the jack to transfer the point of operation around the sole of a shoe supported on the jack, a control device acting when rendered operative to substitute one of said tools for the other in operating position, a tool selecting mechanism comprising a cylinder and means for imparting a step-by-step rotation to said cylinder to actuate said control device to substitute one of said tools for the other in operating position at predetermined points in the transfer of the point of operation around the shoe, and means for adjusting the position of said cylinder axially to determine the tool selected thereby for operation on predetermined portions of the margin of the shoe sole.

17. A machine for operating on shoes having, in combination, a forepart edge tool, a shank edge tool, a shoe supporting jack, means for imparting relative positioning movements to the tool and to the jack to transfer the point of operation around the sole of a shoe supported on the jack, a control device acting when rendered operative to substitute one of said tools for the other in operating position comprising a part revolution clutch, connections including an eccentric cam rendered operative by successive actuations of said clutch to locate alternately one and then the other of said tools in operating position, a tool selecting mechanism comprising a clutch control cylinder, and selector devices for actuating said cylinder at predetermined points in the transfer of the point of operation around the shoe, and means for axially positioning said cylinder to determine the tool selected thereby for operation on predetermined portions of the margin of the shoe sole.

18. A machine for operating on shoes having, in combination, a forepart edge tool, a shank edge tool, a shoe supporting jack, means for imparting relative positioning movements to the tool and to the jack to transfer the point of operation around the sole of the shoe supported on the jack, a templet fixed with relation to the jack and shoe supported thereon, a shoe grading mechanism cooperating with said templet for causing said tools to follow a predetermined contour with relation to said templet and comprising a member movable in accordance with a predetermined pattern during the transfer of the point of operation about the shoe, a stop motion for the machine, a control device acting when rendered operative to substitute one tool for the other in operating position comprising a part revolution clutch, connections including an eccentric cam rendered operative by successive actuations of said clutch to locate alternately one and then the other of said tools in operating position, a tool selecting mechanism comprising a selector shaft, a ratchet cylinder mounted thereon for actuating the clutch, a selector ratchet and pawl mechanism for imparting a rotational movement to said shaft and cylinder controlled by said stop motion, a pawl and ratchet mechanism for actuating said shaft and cylinder controlled by said grading device, and means for adjusting the position of said cylinder axially to determine the tool selected thereby for operation on predetermined portions of the margin of the shoe sole.

19. A machine for operating upon shoes having, in combination, a forepart edge tool, a shank edge tool, a shoe supporting jack, means for imparting relative positioning movements to the tool and to the jack to transfer the point of operation around the sole of a shoe supported on the jack, a control device for substituting one of said tools for the other comprising a shaft, an eccentric driven thereby, a clutch and stopping mechanism of the Horton type having a driven member secured to turn with the shaft, a driving clutch member concentric with the shaft, a clutch control drum, said drum and driven members being provided with oppositely directed stop shoulders, stopping and rebound pawls adapted for engagement respectively with said shoulders, yieldingly actuated locking members to engage said driving and driven clutch members, connections to permit a limited rotational movement of the drum with relation to the driven member to disengage said clutch locking members, a resilient shock absorber connection between said control drum and driven member to absorb the shock of stopping said driven member, and a tool selector mechanism arranged to trip said stopping pawl at a predetermined point in the transfer of the point of operation around the shoe to substitute one of said tools for the other in operating position.

20. A machine for operating upon shoes having, in combination, a forepart edge tool, a shank edge tool, a shoe supporting jack, means for imparting relative positioning movements to the tool and to the jack to transfer the point of operation around the sole of a shoe supported on the jack, a control device for substituting one of said tools for the other comprising a shaft, an eccentric driven thereby, a part revolution clutch and stopping mechanism of the Horton type having a driven member secured to turn with the shaft, a driving clutch member concentric with the shaft, a clutch controlled drum connected to said driven member, said drum and driven members being provided with oppositely directed stop shoulders, positive and resilient stop pawls adapted for engagement with the stop shoulder on said drum, a rebound pawl adapted for engagement with the shoulder on the driven member, a ratchet tool selector disk, trip lugs formed on said stop pawls staggered to engage and trip the resilient stop pawl prior to the release of said positive stop pawl, and means for rotating said ratchet disk to trip said stop pawls at predetermined points in the transfer of the point of operation about the shoe sole.

ALFRED R. MORRILL.